Jan. 25, 1955     I. COHN     2,700,247
ANIMATED SINGING BIRD TOY
Filed June 17, 1952     3 Sheets-Sheet 1
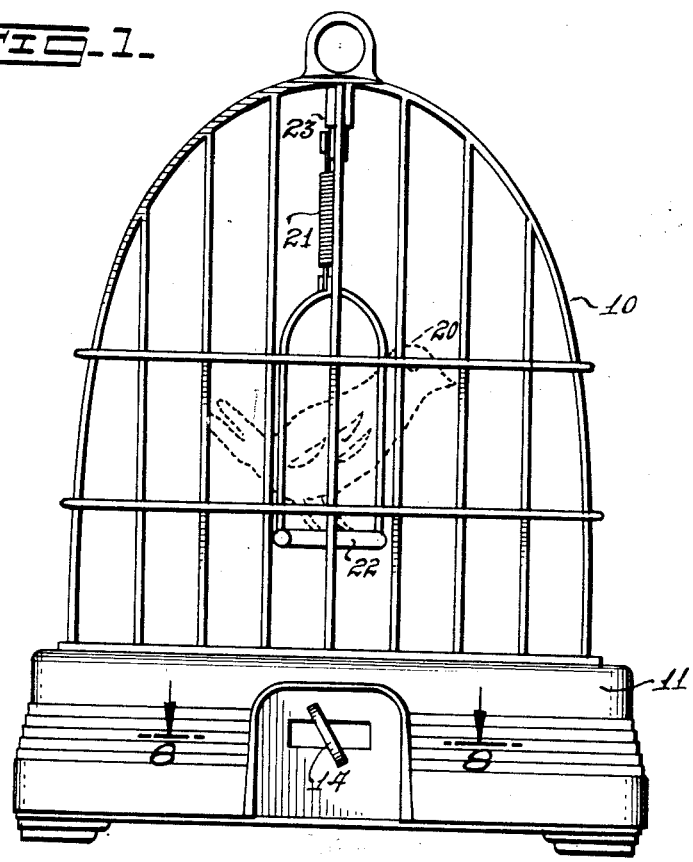
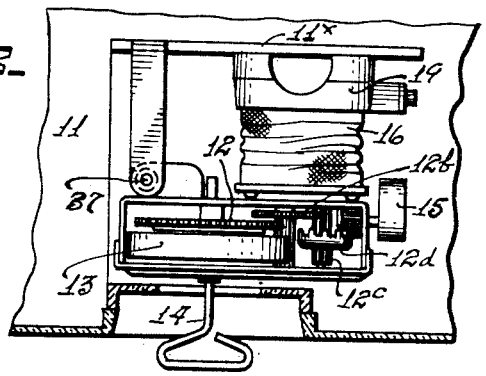
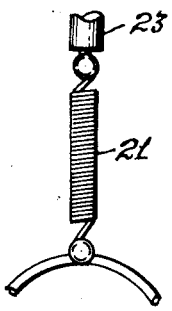
INVENTOR.
Irwin Cohn
BY
H. Lee Helms
ATTORNEY.

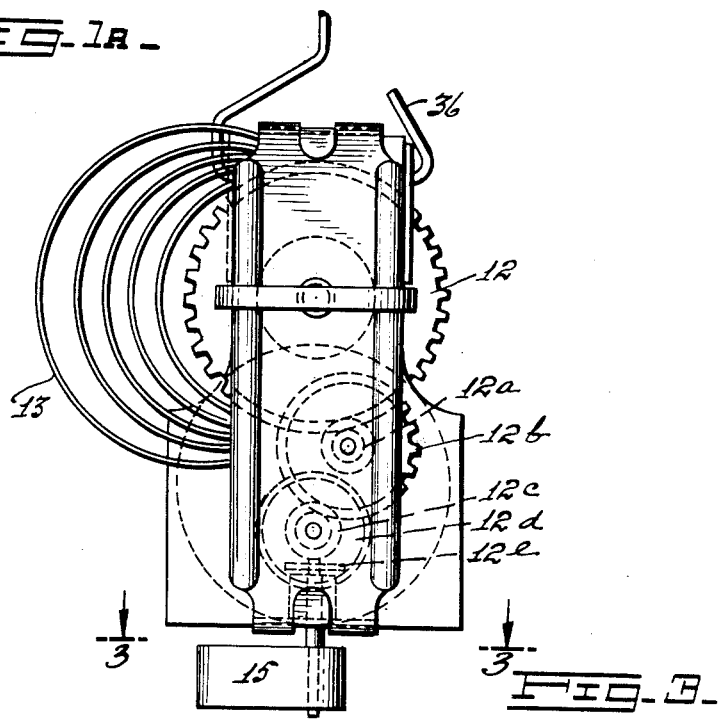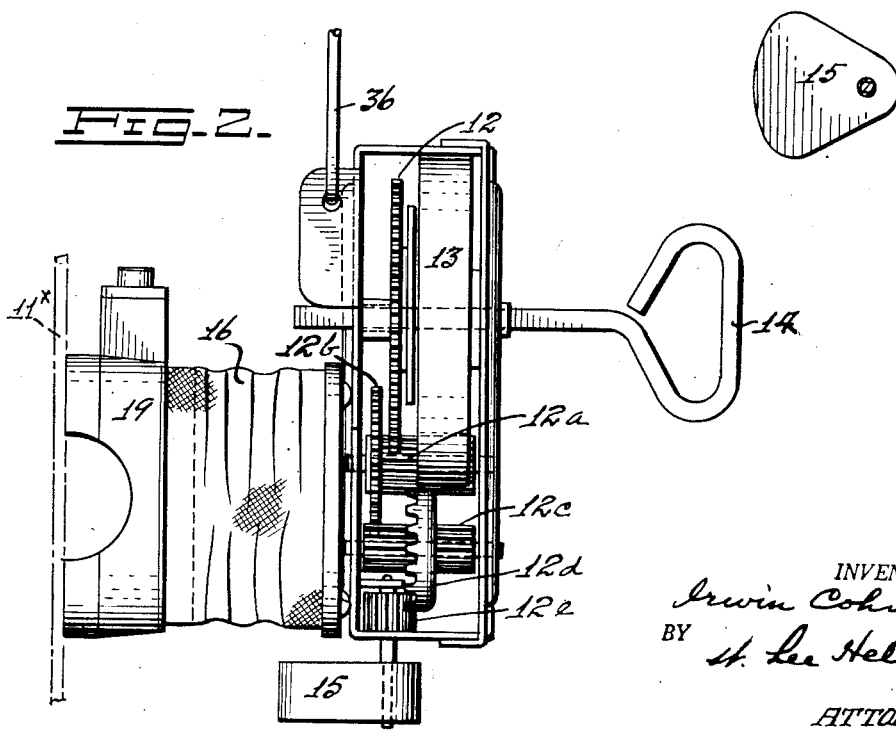

Jan. 25, 1955
I. COHN
2,700,247
ANIMATED SINGING BIRD TOY
Filed June 17, 1952
3 Sheets-Sheet 3
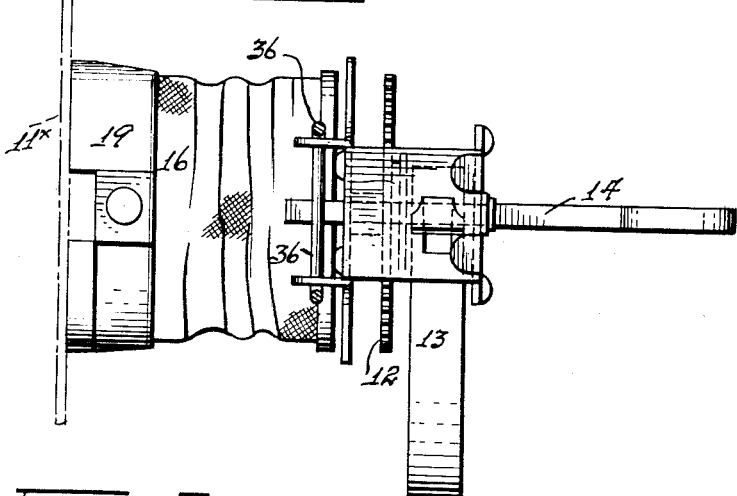
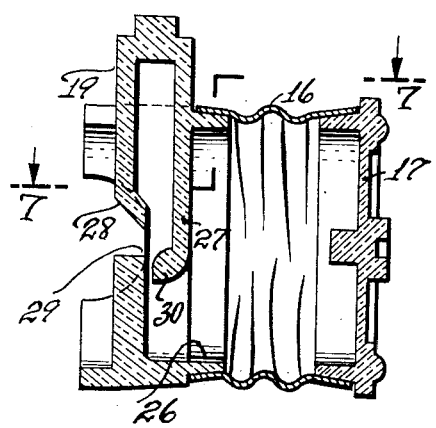
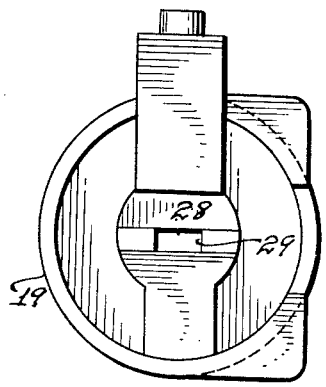
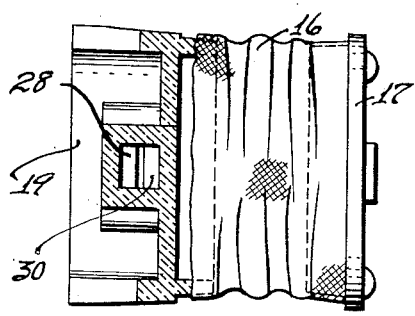
INVENTOR.
Irwin Cohn
BY H. Lee Helms
ATTORNEY.

United States Patent Office 2,700,247
Patented Jan. 25, 1955

2,700,247
ANIMATED SINGING BIRD TOY
Irwin Cohn, Leominster, Mass.

Application June 17, 1952, Serial No. 293,949

1 Claim. (Cl. 46—118)

This invention relates to toys actuated by a spring power mechanism and more particularly to an animated singing bird.

This invention will be understood by reference to the accompanying drawings which show an embodiment in which;

Fig. 1 is a perspective view of the animated bird in a cage,

Fig. 1a is a front view of the spring actuated mechanism used to produce simulated singing, Fig. 2 is a side view of the spring actuated mechanism showing a bellows, Fig. 3 is a view of an eccentric weight used to vibrate the bellows and taken on line 3—3 of Fig. 1a, Fig. 4 is an end view of the spring mechanism and bellows, Fig. 5 is a cross-section through the center of the bellows, showing the whistle construction, Fig. 6 is a top view of the bellows, Fig. 7 is a cross-sectional view of the bellows taken on line 7—7 of Fig. 5, Fig. 8 shows a method of attaching the bellows to the inside base of the bird cage and taken on line 8—8 of Fig. 1 and Fig. 9 is a view of the spring mechanism used to suspend the bird from the top of the cage.

Referring to the drawings, a bird cage 10 having a base 11, preferably made from plastics, is provided with a spring actuated mechanism generally shown in Fig. 1a. The mechanism has a spring 13 which is tensioned by winding key 14. The potential energy of the coil tensioned spring 13 is translated into rotational energy by gears 12 to 12e inclusive and is used to rotate the eccentric weight 15.

Attached to the supporting frame by conventional means, for example by bonding connection with a frame projection is a sound producing assembly consisting of a bellows 16 having an end closure 17 and a unitary whistle member 19.

As shown in Fig. 8 the spring mechanism and the motor assembly is swingingly hung from the inside of the bird cage base 11 (shown in outline) by any conventional means, and the bellows rear end is held motionless by the fixed mounting of the whistle member 19 on a wall within the bird cage base as indicated at 11x.

When the coil spring 13 unwinds it rotates eccentric weight 15 thereby causing the bellows to jiggle, operating the whistle to give a simulated bird-like whistle. The eccentric energy is in part transferred to the cage, causing a bird 20, preferably of plastic, to vibrate because of the vibration of spring 21 which is used to attach the bird stand 22 to a cage projection 23.

The whistle member is of special unitary form having a rearwardly extending flange 26 adapted to receive the bellows, a back internal wall 27, a partial front wall 28 formed with a centrally disposed outlet 29, the back wall having an inturned lip 30 adjacent the outlet 29 and coacting therewith to provide a throat whereby the repeatedly compressed air within the vibrating bellows is caused to emit a succession of sounds.

The bellows is made from a flexible cloth impregnated with plastic, or entirely from flexible plastic.

The method of swingably carrying the spring actuated mechanism is optional and may employ a suspension wire 36 (Figs. 1a and 2) or a hinge having a vertical axis 37 (Fig. 8).

Having described my invention, what I claim and desire to secure by Letters Patent is:

A toy bird cage having a swingable suspended inanimate bird therein and adapted to simulate a moving whistling or warbling bird, comprising a top cage and a base secured thereto, a bird replica suspended in said cage by a light spring mounting secured interiorly to the top of said cage, said base interiorly housing a vibratable mechanism for shaking the cage and operating a whistling sound device, said vibratable mechanism being pivotally suspended within said base and including a spring actuated mechanism having a train of gears adapted to rotate an eccentric weight secured to said spring actuated mechanism at a speed sufficient to cause its momentum to swing said vibratable mechanism on its pivot in response thereto, a bellows actuated by said vibratable device and secured at one end thereto, a whistle member mounted on the other end of said bellows, and secured to said base, whereby vibrations of the spring powered vibratable mechanism about its pivot, induced by rotation of said eccentric weight, cause the bellows to expand and contract thereby producing a whistling sound on said whistle and simultaneously vibrate said cage so that the weight of the bird replica causes actuation of said spring mounting, thereby causing said bird replica to swing.

References Cited in the file of this patent
UNITED STATES PATENTS

| | | |
|---|---|---|
| 56,407 | Gunther | July 17, 1866 |
| 1,100,898 | Mayland | June 23, 1914 |
| 1,512,283 | Fritsche | Oct. 21, 1924 |
| 1,652,096 | Daviau | Dec. 6, 1927 |
| 1,782,843 | Derus | Nov. 25, 1930 |
| 1,886,442 | Wimmer | Nov. 8, 1932 |
| 2,464,665 | Anderson | Mar. 15, 1949 |
| 2,504,811 | Davis | Apr. 18, 1950 |